July 20, 1926.
E. G. PERKINS
STAND
Filed May 12, 1924
1,593,415
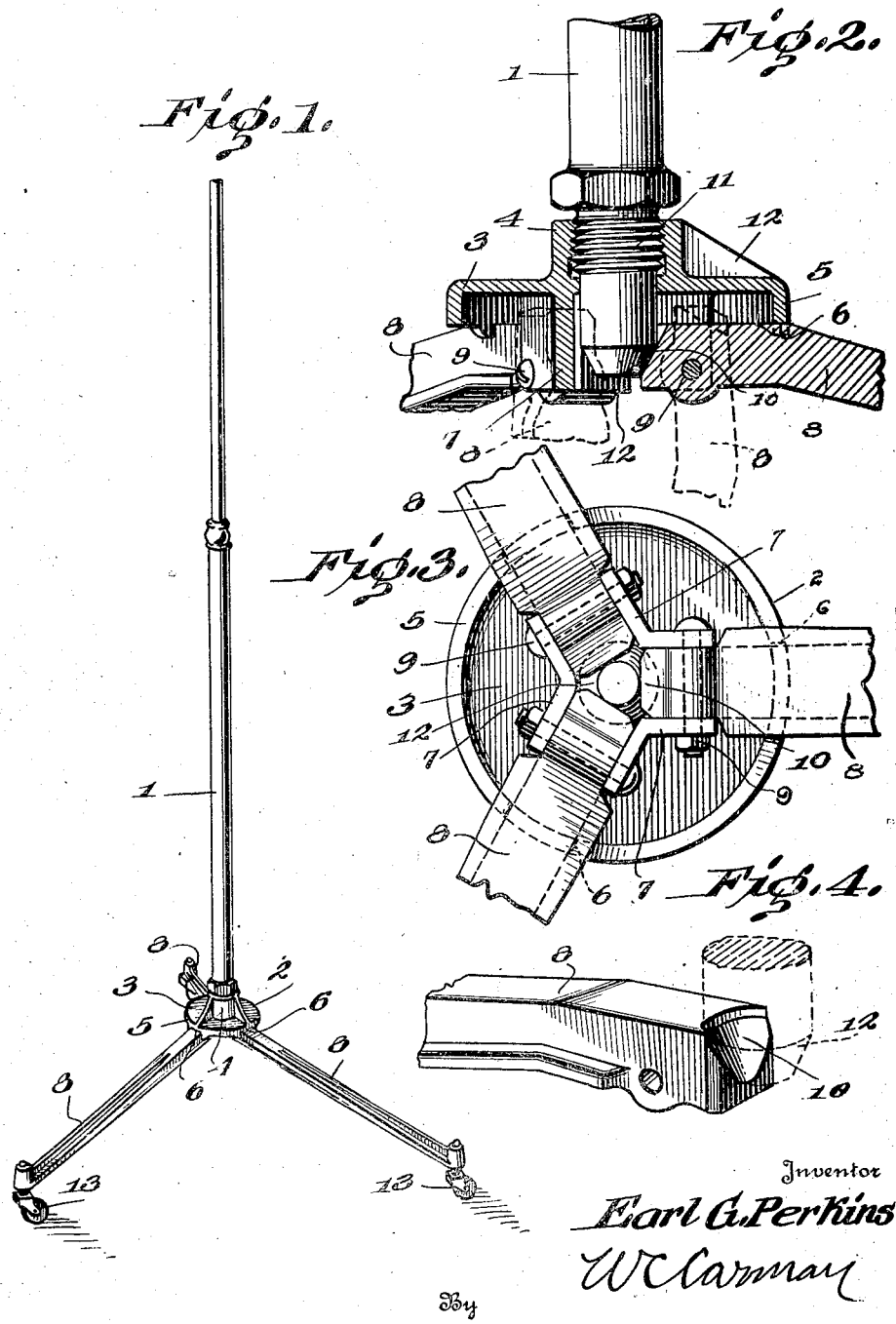
Inventor
Earl G. Perkins
W C Carman
By
Attorney Patented July 20, 1926.

1,593,415

UNITED STATES PATENT OFFICE.

EARL G. PERKINS, OF YOUNGSTOWN, OHIO; FLORENCE M. PERKINS ADMINISTRATRIX OF SAID EARL G. PERKINS, DECEASED.

STAND.

Application filed May 12, 1924. Serial No. 712,764.

My invention relates to stands or supports,—the purpose being to produce a collapsible or folding stand which may be used for various purposes, but designed more particularly for use in support of portable lighting units.

In the drawings, Figure 1 is a perspective view in elevation.

Figure 2 is a fragmentary view, partially in section through one of the legs or feet and the center of the holding base,—the dotted lines showing the legs in folded or collapsed position.

Figure 3 is a bottom plan view of the holding base with a fragmentary view of the legs attached thereto and shown in operative position.

Figure 4 is a fragmentary view of one of the legs detached from the base, but engaging the lower end of the standard, illustrating the method of holding the legs in operative position.

1 represents the standard, which may consist of a single section or of any desired telescoping or extension device.

2 represents the holding base, consisting of a disk 3 provided with a centrally disposed, upstanding internally threaded flange or boss 4, and a depending circumferential flange 5, the latter flange being provided in its lower edge with a plurality of notches or recesses 6, which may be termed "seats" or "rests", for engagement of the legs when in operative position.

The holding base 2 is also provided with downwardly extending lug brackets 7, within which are swingingly secured the legs or feet 8 by means of the bolts 9. The extreme inner end of each of the legs is provided with an upwardly or outwardly flaring oval or curved recess 10, for the purpose hereinafter explained.

The standard 1 is provided adjacent its lower end with a threaded section 11, adapted to engage the internally threaded upstanding flange or boss 4 of the holding base as hereinbefore described, while the extreme lower end of the standard is tapered or beveled as at 12, and adapted to turn snugly into the spider like, flaring circular opening formed by the recesses 10 in the inner ends of the legs 8, for the purpose of locking the legs in operative position. It will be observed that this opening through the disk 3 of the holding base 2 is of smaller diameter than the inner threaded section of the flange 4, and that the lower end of the stand 1 below the threaded section 11 is also of smaller diameter, having a close working fit through the opening in the disk, thus relieving the threaded section from much of the strain which would otherwise be imposed upon it, and thereby adding to the firmness and rigidity of the connection.

To arrange my device in operative position, the legs are first swung outwardly, radially from the holding base, each leg registering in one of the seats or rests 6 in the lower edge of the flange 5, after which the standard 1 is screwed tightly into the flange 4, causing the tapered lower end of the standard to come into firm holding engagement with the recesses 10 in the inner ends of the legs 8.

It will be readily understood that the contact of the legs with the lower edge of the flange 5, that is in the seats 6, gives to the legs a long bearing, thus avoiding a short leverage upon the bolts 9 at the point of attachment to the base plate.

It is obvious that with this construction, when it is desired for transportation or storing purposes, the standard may be turned out of the base, after which the legs will fold into substantially longitudinal, parallel planes, and the entire stand may be wrapped or encased in a package of small, convenient shape.

The outer end of the legs 8 may be provided with desirable castors as shown at 13.

I claim:

1. In an article of the character described, a holding base provided with an internally threaded central opening and a depending circumferential flange, legs swingingly secured to the lower face of said base, and a standard having a threaded section adapted to screw into said opening and to engage the inner ends of said legs.

2. In an article of the character described, a holding base provided with an internally threaded central opening and a depending circumferential flange having recesses in its lower edge, legs swingingly secured to the lower face of said base, and a standard having a threaded section adapted to screw into said opening and to engage the inner ends of said legs.

3. In an article of the character described, a holding base provided with an internally threaded central opening, legs swingingly secured to the lower face of said base, the inner end of each of said legs being provided with a flaring oval recess, and a standard having a threaded section adapted to screw into said opening and a cone-shaped lower terminal to engage the recesses in said legs.

4. In an article of the character described, a holding base provided with an internally threaded central opening and a depending or circumferential flange, legs swingingly secured to the lower face of said base, the inner end of each of said legs being provided with a flaring oval recess, and a standard having a threaded section adapted to screw into said opening and a cone-shaped lower terminal to engage the recesses in said legs.

5. In an article of the character described, a holding base provided with an internally threaded central opening and a depending circumferential flange having recesses in its lower edge, legs swingingly secured to the lower face of said base, the inner end of each of said legs being provided with a flaring oval recess, and a standard having a threaded section adapted to screw into said opening and a cone-shaped lower terminal to engage the recesses in said legs.

In testimony whereof I hereunto affix my signature.

EARL G. PERKINS.